US010063706B2

(12) United States Patent
Abuelsaad et al.

(10) Patent No.: US 10,063,706 B2
(45) Date of Patent: Aug. 28, 2018

(54) MANAGEMENT OF SEQUENTIALLY SCHEDULED CONFERENCES

(71) Applicant: International Business Machines Corporation, Armonk, NY (US)

(72) Inventors: Kelly Abuelsaad, Somers, NY (US); Soobaek Jang, Hamden, CT (US); Maneesh Mehra, Westford, MA (US); Renier R. Morales, Gurabo, PR (US); Michael S. Rieth, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/613,870

(22) Filed: Feb. 4, 2015

(65) Prior Publication Data

US 2016/0227041 A1    Aug. 4, 2016

(51) Int. Cl.
*H04W 4/06*    (2009.01)
*H04M 3/56*    (2006.01)

(52) U.S. Cl.
CPC ............ *H04M 3/565* (2013.01); *H04W 4/06* (2013.01)

(58) Field of Classification Search
CPC ...... H04M 3/565; H04W 4/06; H04W 76/025
USPC ..................... 455/416, 445, 403, 412.2, 466; 370/260–269; 379/93.21, 158, 202.01, 379/205.01; 709/204
See application file for complete search history.

(56) References Cited

U.S. PATENT DOCUMENTS

| | | | |
|---|---|---|---|
| 9,106,731 B1 * | 8/2015 | Boutcher | H04M 3/5175 |
| 2006/0230137 A1 * | 10/2006 | Gare | G06Q 10/10 |
| | | | 709/224 |
| 2007/0033251 A1 | 2/2007 | Mandalia et al. | |
| 2007/0038701 A1 * | 2/2007 | Majors | H04L 12/1813 |
| | | | 709/204 |
| 2010/0042704 A1 * | 2/2010 | Chakra | G06Q 10/109 |
| | | | 709/221 |
| 2011/0051917 A1 * | 3/2011 | Chen | H04M 3/56 |
| | | | 379/202.01 |
| 2011/0135082 A1 * | 6/2011 | Lingafelt | H04L 12/1822 |
| | | | 379/203.01 |
| 2012/0020468 A1 | 1/2012 | Boss et al. | |
| 2013/0251132 A1 * | 9/2013 | Manor | H04L 12/1822 |
| | | | 379/202.01 |
| 2014/0051383 A1 * | 2/2014 | Doerr | H04W 4/16 |
| | | | 455/405 |
| 2014/0092202 A1 * | 4/2014 | Bentley | H04M 3/567 |
| | | | 348/14.08 |

FOREIGN PATENT DOCUMENTS

| | | |
|---|---|---|
| EP | 2642734 A1 | 9/2013 |
| WO | 9735416 A1 | 9/1997 |
| WO | 2012177302 A3 | 12/2012 |

\* cited by examiner

*Primary Examiner* — Kamran Afshar
*Assistant Examiner* — Nicole Louis-Fils
(74) *Attorney, Agent, or Firm* — Maeve M. Carpenter; Maxine L. Barasch; Keohane & D'Alessandro PLLC

(57) ABSTRACT

In general, embodiments of the present invention relate to conference management. Specifically, sequentially scheduled conferences (e.g., conference calls) are determined for a conference participant. The connection details (e.g., call-in details) for the second of the two conferences are retrieved. If the conference is not over when the second conference is scheduled to begin, a connection is initiated with the second conference using the connection details while maintaining a connection to the first conference.

20 Claims, 3 Drawing Sheets

US 10,063,706 B2

MANAGEMENT OF SEQUENTIALLY SCHEDULED CONFERENCES

TECHNICAL FIELD

The present invention relates to conference management. Specifically, the present invention provides the ability to manage sequentially scheduled conferences for a conference participant by automatically joining a second conference in a background while keeping a first conference active.

BACKGROUND

A conference call is a telephone call in which the calling party wishes to have one or more additional parties involved. It allows people in different geographic locations to "meet" at a prearranged time via telephone. In the business world, conference calling can be vital to the business's success, as it can greatly facilitate business communications. A primary benefit of conference calling is that it can save time and money. Employees who may be scattered throughout the country do not have to be in the same place to exchange information or ideas. This also results in savings to the business in travel expenses, such as air transportation or gas mileage as well as hotel costs and meal expenses.

Conference call participant are typically able to call in to the conference call by dialing a telephone number that connects to a conference bridge, which is a central server or type of equipment that links telephone lines and maintains the various communication paths to client devices being used by parties to participate in the conference. Businesses commonly use a specialized service provider who maintains the conference bridge, or who provides the phone numbers and passwords that participants dial to access the meeting or conference call. Often, especially in large corporations, a person may have multiple conference call meetings scheduled for a single day, with a high potential of having sequentially scheduled (or back to back) calls in each day. As with in-person meetings, conference calls may run over an allotted amount of time, causing problems for the person with the sequentially scheduled calls and for other participants joining any of the scheduled conference calls.

SUMMARY

In general, embodiments of the present invention relate to conference management. Specifically, sequentially scheduled conference calls are determined for a conference call participant. The call-in details for the second of the two conference calls are retrieved. If the first conference is not over when the second call is scheduled to begin, a connection is initiated with the second conference call using the call-in details while maintaining a connection to the first conference call.

One aspect of the present invention includes a method for managing sequentially scheduled conferences for a user, comprising the computer-implemented steps of: determining a first conference is sequentially scheduled with a second conference; determining the first conference is not over; retrieving connection details for the second conference; and initiating a connection with the second conference while maintaining a connection to the first conference.

A second aspect of the present invention provides a system for managing sequentially scheduled conferences for a user, comprising: a memory medium comprising program instructions; a bus coupled to the memory medium; and a processor, for executing the program instructions, coupled to the memory medium that when executing the program instructions causes the system to: determine a first conference is sequentially scheduled with a second conference; determine the first conference is not over; retrieve connection details for the second conference; and initiate a connection with the second conference while maintaining a connection to the first conference.

A third aspect of the present invention provides a computer program product for managing sequentially scheduled conferences for a user, the computer program product comprising a computer readable storage device, and program instructions stored on the computer readable storage device, to: determine a first conference is sequentially scheduled with a second conference; determine the first conference is not over; retrieve connection details for the second conference; and initiate a connection with the second conference while maintaining a connection to the first conference.

BRIEF DESCRIPTION OF THE DRAWINGS

These and other features of this invention will be more readily understood from the following detailed description of the various aspects of the invention taken in conjunction with the accompanying drawings in which.

Figure 1:
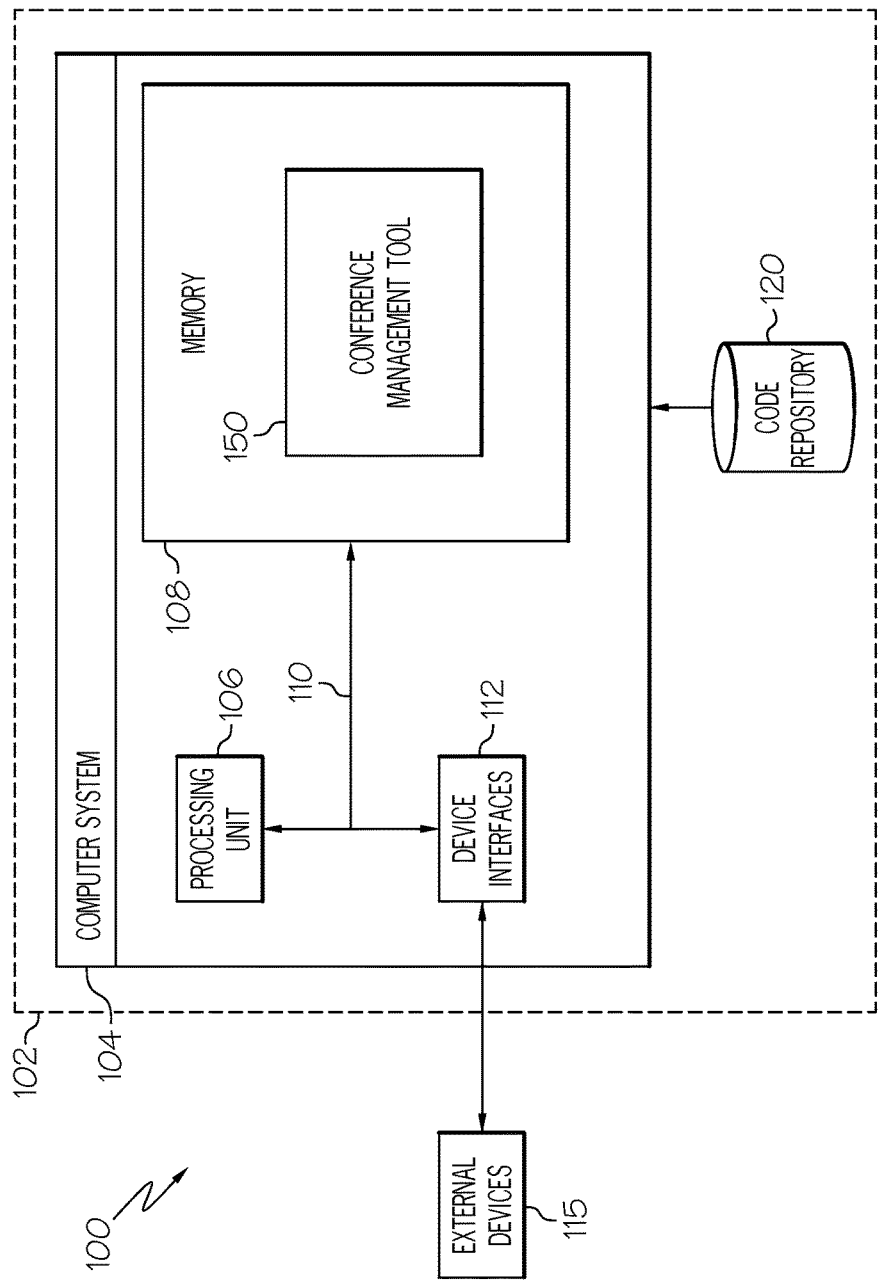
FIG. 1 depicts a computerized implementation according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, the term "developer" refers to any person who writes computer software. The term can refer to a specialist in one area of computer programming or to a generalist who writes code for many kinds of software.

As used herein, a conference can refer to a real-time, or near real-time, communication session involving two (e.g., a direct call from one person to another) or more participants. Examples can include a conference call, a World Wide Web (Web) based conference, a videoconference, and/or a multi-party instant messaging (IM) session. Additionally, the terms "host" and "non-host participant" merely refer to different user roles or permissions associated with subscribers of a conferencing service. For example, the "host" may be the originator of the conference and, consequently, may have privileges that are not offered to the remaining non-host participants. When used, the term "participants" includes both the host and the remaining non-host participants, unless otherwise specified. As used herein, the term "user" may refer to any host or non-host participant utilizing the system and methods described in this disclosure.

As indicated above, embodiments of the present invention relate to conference management. Specifically, sequentially scheduled conference calls are determined for a conference call participant. The call-in details for the second of the two conference calls are retrieved. If the first conference is not over when the second call is scheduled to begin, a connection is initiated with the second conference call using the call-in details while maintaining a connection to the first conference call.

FIG. 1 depicts a computerized implementation 100 according to an embodiment of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communication occurs via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing a passport according to the present invention. It should be understood that any other computers implemented under the present invention may have different components/software, but will perform similar functions. As shown, computer system 104 includes a processing unit 106, memory 108 for storing a conference management tool 150, a bus 110, and device interfaces 112.

Processing unit 106 collects and routes signals representing outputs from external devices 115 (e.g., a keyboard, a pointing device, a display, a graphical user interface, etc.) to conference management tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG).)

In general, processing unit 106 executes computer program code, such as program code for operating conference management tool 150, which is stored in memory 108 and/or code repository 120. While executing computer program code, processing unit 106 can read and/or write data to/from memory 108, and code repository 120. Code repository 120 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

Conference management tool 150 allows for a conference participant to automatically join a second conference call in a background while keeping the first (i.e., current) conference call active. Additionally, conference management tool 150 provides a way to automatically notify others participating in the conference of the participant's situation, thereby allowing the participant to focus on the call at hand.

Figure 2:
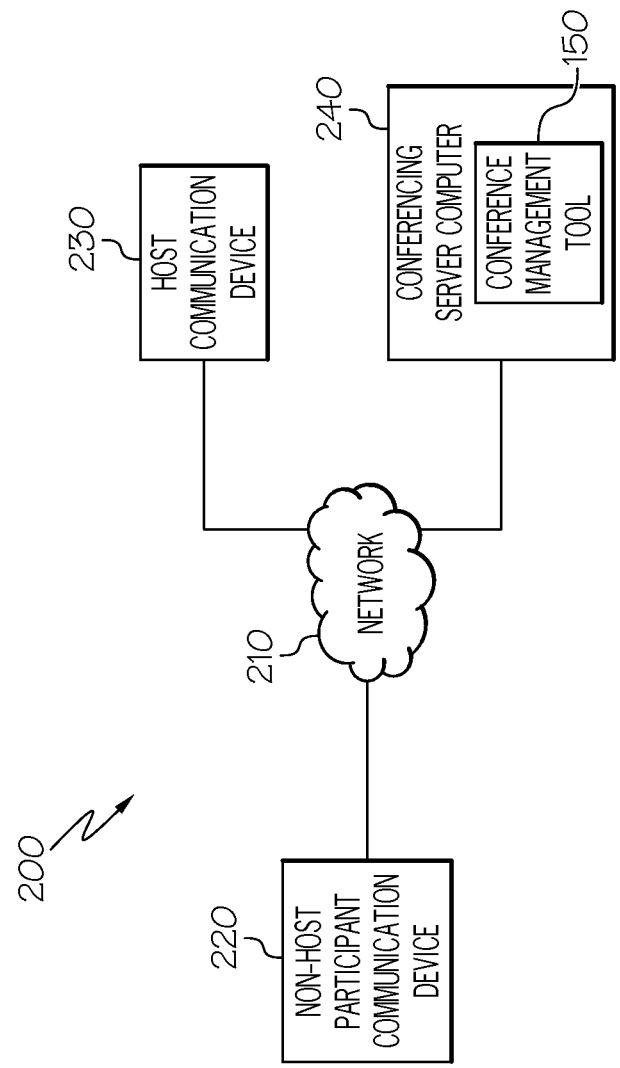
FIG. 2 depicts a functional block diagram illustrating a teleconferencing environment according to an embodiment of the present invention.

FIG. 2 depicts a functional block diagram illustrating a conferencing environment 200 according to an embodiment of the present invention. As shown, conferencing environment 200 includes non-host participant communication device 220, host communication device 230 and conferencing server computer 240, all interconnected via network 210. Network 210 can be, for example, a local area network (LAN), a wide area network (WAN) such as the Internet, or a combination of the two, and can include wired, wireless, or fiber optic connections. Network 210 can also be a telephone network or telecommunications network, including a fixed line network, a wireless network, or a private telephone network. In general, network 210 can be any combination of connections and protocols that will support communication between non-host participant communication device 220, host communication device 230, and conferencing server computer 240.

Non-host participant communication device 220 or host communication device 230 can be a laptop computer, a tablet computer, a netbook computer, a personal computer (PC), a desktop computer, a personal digital assistant (PDA), a smart phone, or any programmable electronic device capable of communicating with each other and with conferencing server computer 240, and with telecommunications capabilities through, for example, a microphone, a telephone, or any other device capable of receiving and converting speech or other sounds into an electrical signal to be transmitted through conferencing environment 200 via network 210. In exemplary embodiments of the present invention, non-host participant communication device 220 or host communication device 230 can be a PDA, a smart phone, a mobile or cellular phone, a landline telephone, or a cordless telephone. Users of non-host participant communication device 220 and host communication device 230 operate each device to access conference calls provided by conferencing server computer 240. While in FIG. 2, only one non-host participant communication device 220 is shown, one of skill in the art will appreciate that within conferencing environment 200 there can be any number of participants operating a communication device such as non-host participant communication device 220 to participate in a scheduled conference call.

Conferencing server computer 240 includes conference management tool 150. Conferencing server computer 240 can be a laptop computer, a tablet computer, a netbook computer, a PC, a desktop computer, a PDA, a smart phone or any programmable electronic device capable of communicating with non-host participant communication device 220 and host communication device 230 via network 210. In an exemplary embodiment of the present invention, conferencing server computer 240 is a conference bridge allowing a large number of participants to participate in conference calls which includes software capabilities such as instructing callers to enter a password before being connected to a call. Businesses may provide their own conferencing server computer or use an available service that provides teleconference hosting using a conference bridge.

Conference management tool 150 manages sequentially (or back to back) scheduled conference calls within conferencing environment 200. Sequentially scheduled conference calls are conference calls scheduled immediately preceding and immediately following one another. The operations of conferencing environment 200 will be described in more detail with reference to a method flow diagram of FIG. 3.

Figure 3:
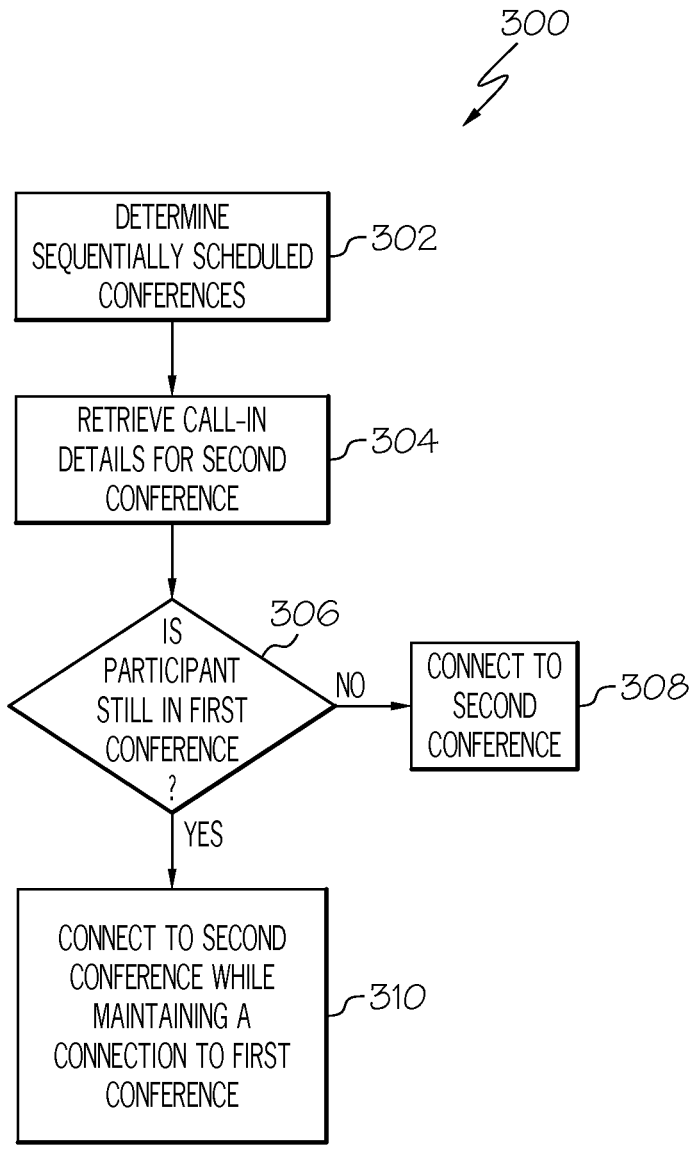
FIG. 3 depicts a method flow diagram for managing sequentially scheduled conference calls according to an embodiment of the present invention.

FIG. 3 depicts a method flow diagram 300 for managing sequentially scheduled conference calls according to an embodiment of the present invention. At 302, a determination is made whether sequentially scheduled conference calls exist for a user. To that end, calendar information related to the user is accessed to determine whether the user currently participating in a first call is also scheduled in a second call that is scheduled to begin immediately following the end of the first call. In one example, the calendar information may be accessed from calendar entries in a calendar application, one or more email messages, or a connection to a device that can provide the calendar information to the user's device (e.g., non-host participant communication device 220 or host communication device 230). In other examples, the calendar information may be accessed via other means.

At 304, the call-in details for the second of the two sequentially scheduled conference calls are retrieved from the calendar information. At a minimum, the call-in details include the phone number of the second call. Additionally, a passcode may also be retrieved that is required to join the second call. Other call-in information related to the second call may also be retrieved at this time (e.g., number of participants, participant names, etc.).

At 306, a determination is made whether the first conference call has ended at a predefined time schedule. The predefined time schedule may be the time of the scheduled begin time of the second conference call or a predefined number of minutes before the scheduled begin time of the subsequent call. For example, if the second meeting is scheduled to begin at 4 p.m., the determination may be made at the scheduled begin time (or 4 p.m.), two minutes prior (or 3:58 p.m.), or five minutes prior (or 3:55 p.m.).

If the user has concluded his/her participation in the first conference call (e.g., call has ended or user has left the call) when the determination is made, the user is automatically connected to the second conference using the call-in details at 308 so that the user can join the new call. If the first conference call is ongoing, a connection is made to the second conference call (and left on hold) from the user's device while maintaining the connection to the prior call at 310.

When the connection is made to the second conference call, a pre-recorded message may be used to apprise the other conference participants of the user's situation. For example, a pre-recorded name announcement upon joining the call may be made so other parties on the call (newly dialed in) know that the user has been joined, but is currently on hold. The announcements may differ based on the role of the user (i.e., host vs. non-host participant). An example announcement for a non-host participant may resemble "Joe Smith has joined the call, but on hold", whereas an example announcement for a host may resemble "Thanks for joining the call. I have opened this call, but am currently on another call. I will join this call shortly". In one example, more than one pre-defined message may exist for the user. The pre-defined message used may be based on a passcode entered by the user.

Alternatively or in addition, an engagement notification (e,g., email message, text message, chat notification, etc.) may be made to the host and/or non-host participants of the next call telling them that the user is still engaged in a previous call. Upon disconnecting from the first call, the user is automatically switched to the next call, which is already connected. Depending on the phone system and conference call setup, a separate join notification may be sent to others when the user actually joins the second conference. The notification may include a beep sound, name announcement, or other predefined custom announcement notification.

In one example, a timeout period including preferences may also be set up for the second conference call by the host. When the timeout period is reached, an action may be performed based on the pre-defined host preferences. The actions may include, but are not limited to, ending the second call, automatically rescheduling the second call, or beginning the second call without the host. In the latter example, the host may still join the second call using the method described above if it is started without the host.

It will be appreciated that the method process flow diagram of FIG. 3 represents a possible implementation of a process flow for managing sequentially scheduled conferences, and that other process flows are possible within the scope of the invention. The method process flow diagram discussed above illustrates the architecture, functionality, and operation of possible implementations of systems, methods, and computer program products according to various embodiments of the present invention. In this regard, each portion of the flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

Further, it can be appreciated that the approaches disclosed herein can be used within a computer system for managing sequentially scheduled conferences. In this case, as shown in FIG. 1, conference management tool 150 can be provided, and one or more systems for performing the processes described in the invention can be obtained and deployed to computer infrastructure 102 (FIG. 1). To this extent, the deployment can comprise one or more of: (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communication network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, conference management tool 150 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network, and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create a means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided with this invention an approach for managing sequentially scheduled conferences. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for managing sequentially scheduled conferences for a user, comprising computer-implemented steps of:
extracting information from an electronic calendar;
receiving, from the user, input of preferences comprising:
an amount of time, and
an action to be taken in response to a first conference overrunning a first time allotment by the amount of time into a second time allotment, wherein the first time allotment is for a first conference and the second time allotment is for a second conference, wherein the action to be taken is one of:
ending the second conference,
rescheduling the second conference, or
beginning the second conference without the user;
determining, based on the extracted information, that the first conference is sequentially scheduled with the second conference;
determining the first conference is not over;
retrieving connection details for the second conference;
initiating, on a conferencing server computer comprising a conference bridge, a connection with the second conference while maintaining a connection to the first conference;
receiving a passcode from the user;
providing an engagement notification, based on the received passcode, to one or more conference participants other than the user when the connection to the second conference is initiated, wherein the engagement notification comprises at least one of an email message, text message, or chat notification that indicates that the user has been connected to the second conference, but is currently on hold;
playing a pre-recorded message to which the engagement notification corresponds;
determining that the amount of time has expired; and
executing the action in response to the determination that the amount of time has expired;
wherein the first conference and the second conference are each a multi-party instant messaging session;
wherein the method is performed on a smartphone.

2. The method of claim 1, wherein the first and second conferences are conference calls, and the connection details for the second conference include a phone number related to the second conference.

3. The method of claim 1, further comprising a computer-implemented step of providing an engagement notification to one or more conference participants of user engagement in the first conference when the connection to the second conference is initiated.

4. The method of claim 3, wherein the engagement notification is based on a predefined passcode and includes at least one of an email message, text message, or chat notification.

5. The method of claim 1, further comprising a computer-implemented step of joining the second conference when the user is disconnected from the first conference.

6. The method of claim 5, further comprising a computer-implemented step of generating a join notification to one or more conference participants when the user joins the second conference.

7. A system for managing sequentially scheduled conferences for a user, comprising:
a memory medium comprising program instructions;
a bus coupled to the memory medium; and
a processor, for executing the program instructions, coupled to the memory medium that when executing the program instructions causes the system to:
extract information from an electronic calendar;
receive, from the user, input of preferences comprising:

an amount of time, and
an action to be taken in response to a first conference overrunning a first time allotment by the amount of time into a second time allotment, wherein the first time allotment is for a first conference and the second time allotment is for a second conference, wherein the action to be taken is one of:
ending the second conference,
rescheduling the second conference, or
beginning the second conference without the user;
determine, based on the extracted information, that the first conference is sequentially scheduled with the second conference;
determine the first conference is not over;
retrieve connection details for the second conference;
initiate, on a conferencing server computer comprising a conference bridge, a connection with the second conference while maintaining a connection to the first conference;
receive a passcode from the user;
provide an engagement notification, based on the received passcode, to one or more conference participants other than the user when the connection to the second conference is initiated, wherein the engagement notification, comprises at least one of an email message, text message, or chat notification, that indicates that the user has been connected to the second conference, but is currently on hold;
play a pre-recorded message to which the engagement notification corresponds;
determine that the amount of time has expired; and
execute the action in response to the determination that the amount of time has expired;
wherein the first conference and the second conference are each a multi-party instant messaging session;
wherein the system is a smartphone.

8. The system of claim 7, wherein the first and second conferences are conference calls and the connection details for the second conference include a phone number related to the second conference.

9. The system of claim 7, the memory medium further comprising instructions to provide an engagement notification to one or more conference participants of user engagement in the first conference when the connection to the second conference is initiated.

10. The system of claim 9, wherein the engagement notification is based on a predefined passcode and includes at least one of an email message, text message, or chat notification.

11. The system of claim 7, the memory medium further comprising instructions to join the second conference when the user is disconnected from the first conference.

12. The system of claim 11, the memory medium further comprising instructions to generate a join notification to one or more conference participants when the user joins the second conference.

13. The system of claim 12, wherein the join notification includes at least one of a beep, name announcement, or predefined custom announcement.

14. A computer program product for managing sequentially scheduled conferences for a user, the computer program product comprising a computer readable storage device, and program instructions stored on the computer readable storage device, to:
extract information from an electronic calendar;
receive, from the user, input of preferences comprising:
an amount of time, and
an action to be taken in response to a first conference overrunning a first time allotment by the amount of time into a second time allotment, wherein the first time allotment is for a first conference and the second time allotment is for a second conference, wherein the action to be taken is one of:
ending the second conference,
rescheduling the second conference, or
beginning the second conference without the user;
determine, based on the extracted information, that the first conference is sequentially scheduled with the second conference;
determine the first conference is not over;
retrieve connection details for the second conference;
initiate, on a conferencing server computer comprising a conference bridge, a connection with the second conference while maintaining a connection to the first conference;
receive a passcode from the user;
provide an engagement notification, based on the received passcode, to one or more conference participants other than the user when the connection to the second conference is initiated, wherein the engagement notification comprises at least one of an email message, text message, or chat notification that indicates that the user has been connected to the second conference, but is currently on hold;
play a pre-recorded message to which the engagement notification corresponds;
determine that the amount of time has expired; and
execute the action in response to the determination that the amount of time has expired;
wherein the first conference and the second conference are each a multi-party instant messaging session;
wherein the computer program product is a smartphone.

15. The computer program product of claim 14, wherein the first and second conferences are conference calls and the connection details for the second conference include a phone number related to the second conference.

16. The computer program product of claim 14, further comprising program instructions stored on the computer readable storage device to provide an engagement notification to one or more conference participants of user engagement in the first conference when the connection to the second conference is initiated.

17. The computer program product of claim 16, wherein the engagement notification is based on a predefined passcode and includes at least one of an email message, text message, or chat notification.

18. The computer program product of claim 14, further comprising program instructions stored on the computer readable storage device to join the second conference when the user is disconnected from the first conference.

19. The computer program product of claim 18, further comprising program instructions stored on the computer readable storage device to generate a join notification to one or more conference participants when the user joins the second conference, wherein the join notification includes at least one of a beep, name announcement, or predefined custom announcement.

20. The method of claim 1, wherein the action comprises one of: ending the second conference, rescheduling the second conference, or beginning the second conference without the user.

* * * * *